United States Patent
Aabye et al.

(10) Patent No.: US 12,531,839 B2
(45) Date of Patent: Jan. 20, 2026

(54) TECHNIQUES FOR SECURELY COMMUNICATING SENSITIVE DATA FOR DISPARATE DATA MESSAGES

(71) Applicant: Visa International Service Association, San Francisco, CA (US)

(72) Inventors: Andreas Aabye, San Mateo, CA (US); Christian Aabye, Redwood City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 18/604,174

(22) Filed: Mar. 13, 2024

(65) Prior Publication Data
US 2024/0223538 A1    Jul. 4, 2024

Related U.S. Application Data

(63) Continuation of application No. 17/284,750, filed as application No. PCT/US2018/055833 on Oct. 15, 2018, now Pat. No. 11,973,742.

(51) Int. Cl.
*H04L 9/40*    (2022.01)
*H04L 9/08*    (2006.01)
*H04L 9/32*    (2006.01)

(52) U.S. Cl.
CPC ........ *H04L 63/0414* (2013.01); *H04L 9/0866* (2013.01); *H04L 9/0894* (2013.01);
(Continued)

(58) Field of Classification Search
None
See application file for complete search history.

(56) References Cited

U.S. PATENT DOCUMENTS

| 9,065,643 B2 | 6/2015 | Hurry et al. |
| 9,294,268 B2 | 3/2016 | Von Mueller et al. |

(Continued)

FOREIGN PATENT DOCUMENTS

| CN | 103221958 A | 7/2013 |
| JP | 2005202541 A | 7/2005 |

(Continued)

OTHER PUBLICATIONS

Bird, Katie; "Changes to the Issuer Identification Number (IIN) standard"; 2016; retrieved from the Internet https://www.iso.org/news/2016/11/Ref2146.html; pp. 1-2, as printed. (Year: 2016).*

(Continued)

*Primary Examiner* — Michael W Chao
(74) *Attorney, Agent, or Firm* — Kilpatrick Townsend & Stockton LLP

(57) ABSTRACT

Systems and methods are disclosed for securely communicating sensitive such as an identifier. A user device may receive a first message comprising a terminal type indicator. For certain values of the terminal type indicator, the user device may be configured to transmit a request message comprising a first identifier and an encrypted identifier. For other values of the terminal type indicator, the user device may be configured to generating an obfuscated identifier based at least in part on a first portion of a second identifier and a second portion of the encrypted identifier. The user device may then transmit a request message that includes the obfuscated identifier and the encrypted identifier.

20 Claims, 9 Drawing Sheets

(52) U.S. Cl.
CPC ............ *H04L 9/321* (2013.01); *H04L 63/102* (2013.01); *H04L 2209/16* (2013.01); *H04L 2209/20* (2013.01); *H04L 2209/56* (2013.01)

(56) References Cited

U.S. PATENT DOCUMENTS

| | | | |
|---|---|---|---|
| 9,647,832 B2* | 5/2017 | Le Saint | ............... H04L 9/14 |
| 9,703,974 B1 | 7/2017 | Surkatty | |
| 10,963,887 B1 | 3/2021 | Zigoris et al. | |
| 11,783,056 B2 | 10/2023 | Haager et al. | |
| 11,973,742 B2 | 4/2024 | Aabye et al. | |
| 2002/0116341 A1 | 8/2002 | Hogan et al. | |
| 2005/0222961 A1 | 10/2005 | Staib et al. | |
| 2007/0208671 A1 | 9/2007 | Brown et al. | |
| 2007/0215698 A1* | 9/2007 | Perry | ............... G06Q 20/409 235/380 |
| 2008/0183622 A1* | 7/2008 | Dixon | ............... G06Q 20/0855 705/44 |
| 2008/0203151 A1* | 8/2008 | Dixon | ............... G06K 5/00 235/487 |
| 2009/0006262 A1* | 1/2009 | Brown | ............... H04L 9/32 705/64 |
| 2009/0030845 A1* | 1/2009 | Hurry | ............... H04L 9/12 705/50 |
| 2009/0045257 A1 | 2/2009 | Maus | |
| 2009/0184163 A1 | 7/2009 | Hammad et al. | |
| 2011/0006122 A1* | 1/2011 | Chenot | ............... G07F 7/10 235/493 |
| 2013/0132281 A1 | 5/2013 | Ankolekar et al. | |
| 2013/0297414 A1 | 11/2013 | Goldfarb et al. | |
| 2014/0019276 A1 | 1/2014 | Rifaat et al. | |
| 2014/0129357 A1 | 5/2014 | Goodwin | |
| 2014/0164243 A1 | 6/2014 | Aabye et al. | |
| 2014/0337998 A1 | 11/2014 | Johansson et al. | |
| 2015/0006390 A1 | 1/2015 | Aissi et al. | |
| 2015/0032627 A1* | 1/2015 | Dill | ............... G06Q 20/385 705/44 |
| 2015/0046339 A1 | 2/2015 | Wong et al. | |
| 2015/0074392 A1 | 3/2015 | Boivie et al. | |
| 2015/0112870 A1* | 4/2015 | Nagasundaram | .. G06Q 20/3821 705/67 |
| 2015/0128285 A1 | 5/2015 | LaFever et al. | |
| 2015/0180836 A1 | 6/2015 | Wong et al. | |
| 2015/0220917 A1 | 8/2015 | Aabye et al. | |
| 2015/0235211 A1 | 8/2015 | Hurry et al. | |
| 2015/0332262 A1 | 11/2015 | Lingappa | |
| 2016/0036790 A1 | 2/2016 | Shastry et al. | |
| 2016/0155117 A1 | 6/2016 | Badenhorst | |
| 2017/0161516 A1 | 6/2017 | Mondal et al. | |
| 2017/0228728 A1 | 8/2017 | Sullivan | |
| 2017/0364705 A1 | 12/2017 | Villars | |
| 2018/0025348 A1* | 1/2018 | Shauh | ............... G06Q 20/382 705/44 |
| 2018/0174119 A1 | 6/2018 | Richards et al. | |
| 2018/0174121 A1 | 6/2018 | Denton et al. | |
| 2018/0174138 A1 | 6/2018 | Subbarayan et al. | |
| 2018/0276666 A1* | 9/2018 | Haldenby | ............... H04L 9/3268 |
| 2019/0097794 A1* | 3/2019 | Nix | ............... H04W 52/0235 |
| 2019/0281042 A1 | 9/2019 | Jakobsson | |
| 2020/0007542 A1 | 1/2020 | Maierean | |
| 2020/0280855 A1* | 9/2020 | Avetisov | ............... H04L 63/20 |
| 2021/0036856 A1* | 2/2021 | Wang | ............... H04L 9/3213 |
| 2021/0044976 A1* | 2/2021 | Avetisov | ............... H04W 12/08 |
| 2021/0258308 A1* | 8/2021 | Avetisov | ............... H04L 9/0825 |

FOREIGN PATENT DOCUMENTS

| | | |
|---|---|---|
| KR | 101519151 B1 | 5/2015 |
| KR | 101802862 B1 | 11/2017 |
| WO | 2009003080 A1 | 12/2008 |

OTHER PUBLICATIONS

Intention to Grant, mailed Nov. 18, 2024, in European Patent Application No. EP23212633.4, 7 pages.
Notice of Decision to Grant, mailed Oct. 9, 2024, Chinese Patent Application No. CN201880098694.3, 5 pages.
Office Action, mailed Jul. 31, 2024, Chinese Patent Application No. CN201880098694.3, 9 pages.
"EMV Integrated Circuit Card Specifications for Payment Systems", Book 2, Security and Key Management, Version 4.3, Nov. 2011, 174 pages.
"Visa Contactless Payment Specification", Visa Supplemental Requirements, Version 2.1, May 2009, 285 pages.
Non-Final Office Action, mailed May 10, 2023, U.S. Appl. No. 17/284,750, 18 pages.
Notice of Allowance, mailed Dec. 20, 2023, U.S. Appl. No. 17/284,750, 18 pages.
Office Action, mailed Oct. 30, 2023, Chinese Patent Application No. CN201880098694.3, 11 pages.
Extended European Search Report, mailed Sep. 24, 2021, European Patent Application No. EP18937502.5, 7 pages.
Intention to Grant, mailed May 17, 2023, European Patent Application No. EP18937502.5, 8 pages.
First Examination Report, mailed Dec. 1, 2022, Indian Patent Application No. IN202147020683, 6 pages.
Notice of Decision to Grant, mailed Nov. 29, 2022, Japanese Application No. JP2021-545350, 2 pages.
Office Action, mailed Jul. 26, 2022, Japanese Application No. JP2021-545350, 4 pages.
Notice of Decision to Grant, mailed Dec. 1, 2023, Japanese Application No. JP2023-009214, 2 pages.
Office Action, mailed Jun. 7, 2023, Korean Application No. KR10-2021-7013465, 7 pages.
International Search Report and Written Opinion, mailed Jul. 1, 2019, International Application No. PCT/US2018/055833, 11 pages.
Application No. SG11202103570U, Written Opinion, mailed Jan. 4, 2023, 7 pages.
Application No. EP23212633.4, Extended European Search Report, Mailed on Mar. 4, 2024, 6 pages.
Application No. KR10-2021-7013465, Notice of Decision to Grant, Mailed on Feb. 27, 2024, 7 pages.
Application No. SG11202103570U, Notice of Decision to Grant, Mailed on Feb. 27, 2024, 4 pages.

* cited by examiner

TECHNIQUES FOR SECURELY COMMUNICATING SENSITIVE DATA FOR DISPARATE DATA MESSAGES

CROSS-REFERENCE TO RELATED APPLICATIONS

This application is a Continuation of U.S. application Ser. No. 17/284,750 filed Apr. 12, 2021, which is the U.S. national stage application of PCT/US2018/055833, filed Oct. 15, 2018, the disclosures of which are incorporated herein by reference in their entirety.

BACKGROUND

Embodiments of the present disclosure relate to obfuscating sensitive data within messages utilized in a transaction. These techniques can be applied to contact and/or contactless smart card transactions. Generally, contactless smart cards are designed to provide a consumer with an efficient method of payment. The smart cards are able to provide required information to a point of sale (POS) device to complete the transaction by using, for example, radio frequency or infrared signals. The POS device receives the provided information and may process a transaction.

The information sent by a smart card can include sensitive data such as a user's account identifier (e.g., a personal account number). As a result, security measures are needed to protect the user from sophisticated fraudsters who may intercept this information. Current techniques may be problematic because the entire account identifier is unencrypted. In other conventional techniques, the account identifier may be encrypted but is still transmitted and/or provided according to a known protocol having known data fields. An intelligent fraudster may still easily identify the encrypted data field within a message and are thus, more likely to be able to utilize the information for their nefarious acts. Additionally, using conventional techniques, the account identifier may remain static, potentially allowing a fraudster to track a user's transactions.

Still further, conventional system do not restrict usage of sensitive information. For example, a fraudster, once having obtained sensitive information may utilize the sensitive information in a variety of contexts.

Embodiments of the invention address these and other problems, individually and collectively.

BRIEF SUMMARY

Embodiments of the present invention are directed to methods, systems, devices, and computer readable media that can be used to securely communicate an account identifier (e.g., a PAN) associated with a user device such as a contactless smart card. In some embodiments, a user device may store a primary account number (PAN) and a secondary account number (SAN). An account identifier (e.g., the PAN) may be communicated in a manner that does not allow the account identifier to be tracked for privacy protection. Advantageously, in embodiments of the invention, account information is communicated in a manner that is secure and that does not require updating the existing payment infrastructure in any significant way.

An additional account identifier (e.g., the SAN) may be utilized in embodiments discussed herein in contexts in which a static identifier is needed. By way of example, some types of access devices are expected to allow or deny access to a resource by the user in near real time. Accordingly, such access devices may utilize a static identifier to check against an allow list and/or a block list in order to quickly allow or reject access to a user of the smart card. The additional account identifier (e.g., the SAN) may be utilized only in certain situations. For example, the system may ensure that a SAN is only usable in transactions involving a terminal and/or merchant and/or transaction of a particular type. As a non-limiting example, the system may be configured to ensure that a SAN may only be utilized in a transaction involving a transit terminal (e.g., a turnstile of a transit authority).

One embodiment of the invention is directed to a method comprising, receiving, by a user device from an access device, a first message comprising a terminal type indicator. The method may further comprise, in response to the terminal type indicator indicating a first terminal type, transmitting, from the user device to the access device, a request message comprising a first identifier (e.g., a SAN) and an encrypted identifier (e.g., an encrypted identifier generated from a PAN and a transaction counter). The method may further comprise, in response to the terminal type indicator indicating a second terminal type, generating, by the user device, an obfuscated identifier based at least in part on a first portion of a second identifier (e.g., a primary PAN) and a second portion of the encrypted identifier. The method may further comprise transmitting, from the user device to the access device. In some embodiments, the request message may comprise the obfuscated identifier and the encrypted identifier.

Another embodiment of the invention is directed to a user device comprising one or more processors, and one or more memories comprising computer-executable instructions that, when executed by the one or more processors causes the user device to perform operations. The operations may comprise receiving, by a user device from an access device, a first message comprising a terminal type indicator. The operations may further comprise, in response to the terminal type indicator indicating a first terminal type, transmitting, from the user device to the access device, a request message comprising a first identifier (e.g., a SAN) and an encrypted identifier (e.g., an encrypted identifier generated from a primary PAN and a transaction counter). The operations may further comprise, in response to the terminal type indicator indicating a second terminal type, generating, by the user device, an obfuscated identifier based at least in part on a first portion of a second identifier (e.g., a primary PAN) and a second portion of the encrypted identifier. The operations may further comprise transmitting, from the user device to the access device. In some embodiments, the request message may comprise the obfuscated identifier and the encrypted identifier.

Another embodiment of the invention is directed to a (non-transitory) computer readable medium. The computer readable medium comprises code for performing the methods discussed herein. In some embodiments, a user device such as a smart card may comprise this computer-readable medium.

These and other embodiments of the invention are described in further detail below, with reference to the figures.

DETAILED DESCRIPTION

Figure 1:
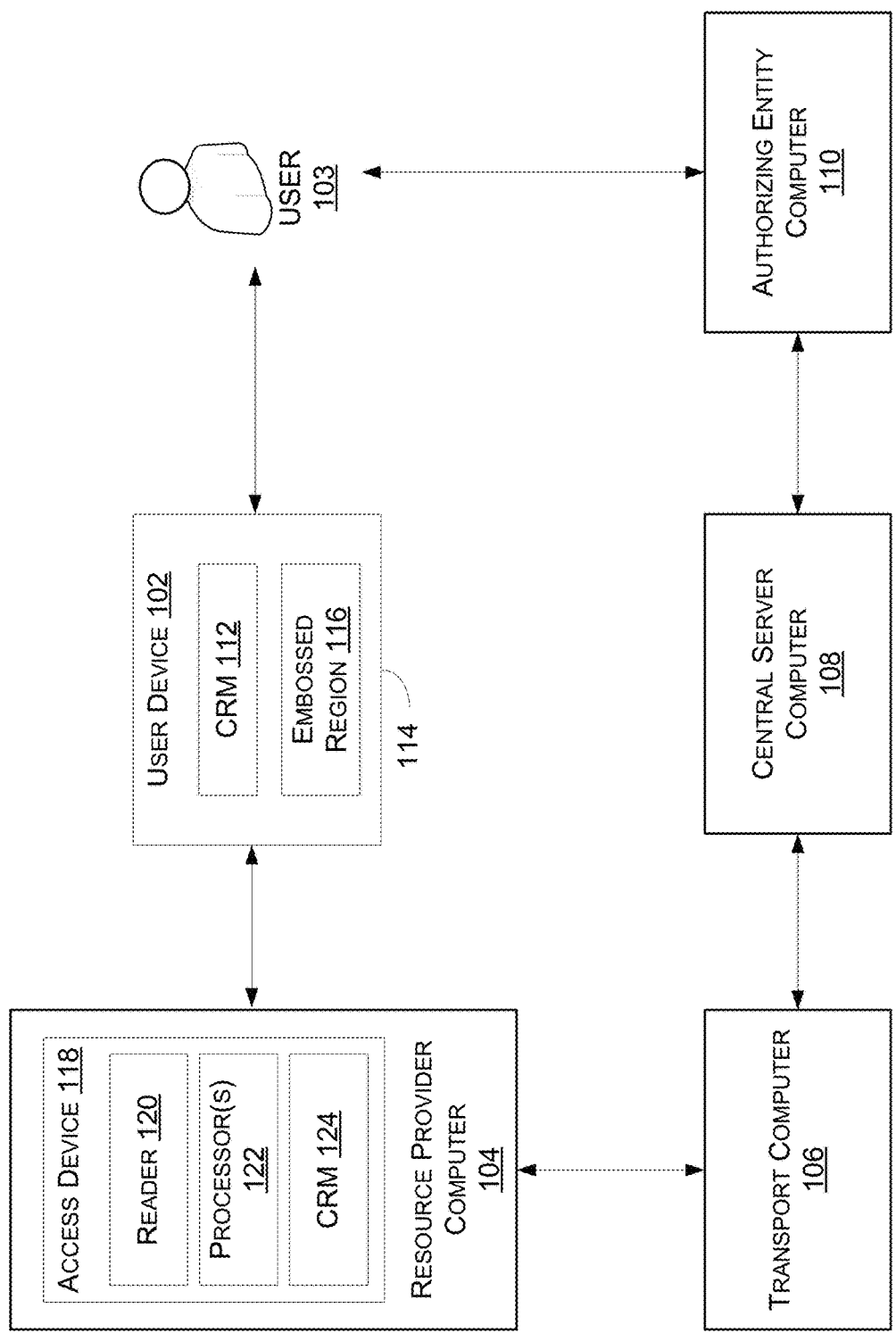
FIG. 1 shows a block diagram of a system for processing a transaction, according to some embodiments.

As described above, in a convention payment transaction, an account identifier (e.g., a personal account identifier, also referred to as a primary PAN) is not encrypted when it passes from a user device such as a contactless smart card to an access device (e.g., a POS terminal, a turnstile reader, etc.) and eventually through the traditional payment processing network. In some conventional techniques, the account identifier may be encrypted and/or obfuscated, however the encrypted/obfuscated data may still be provided in a traditional data field of a transaction message and thus, the data field is readily identifiable to potential fraudsters.

While encryption of the entire account identifier is possible, it may not be practical under all circumstances. If the account identifier is encrypted, a conventional transaction processing system may not be able to successfully process the transaction. For example, a typical account identifier includes a bank identification number (BIN). The BIN is used to route an authorization request message to the proper issuer or payment processor. If the account identifier is encrypted, then the BIN will change. If the BIN changes, then a proper authorization request message cannot be routed to the correct issuer.

Another restriction associated with encrypting the entire account identifier is related to an error check that is associated with the sequence of digits in an account identifier. Error checking may be achieved using a checksum algorithm that determines if the digits of the account identifier are in the proper sequence. An example checksum algorithm is a modulo 10 algorithm (which is also known as a "Luhn check").

Therefore, encryption of an entire account identifier would corrupt at least the BIN, the checksum, and the ability to identify an account identifier via printed digits on a receipt.

The processes described herein can be used to protect the account identifier at the initiating device (e.g., the smart card). As will be illustrated in further detail below, embodiments of the invention obfuscate only a portion of an account identifier, which allows the BIN the account to remain unencrypted and the Luhn check to continue to be utilized. In addition, embodiments of the invention can also be used not only obfuscate an account identifier within a typical authorization request message, but also to ensure that the entire encrypted account identifier is provided elsewhere in the message so as to make it less likely to be identifiable.

The techniques discussed herein also enable the obfuscated identifier or a SAN to be utilized by the user device depending on the context of the transaction (e.g., what type of terminal is requesting the information). Accordingly, for transactions being associated with a first set of transaction types, terminal types, etc., the obfuscated PAN may be utilized in the transaction while the SAN may be utilized for transactions associated with a second set of transaction types, terminal types, etc. The SAN may be restricted to only be processed by an authorizing entity when utilized in the allowable contexts. For the first set of transaction/terminal type transactions, the obfuscated PAN may be utilized such that the user's activities may not be tracked. These techniques enable a static identifier to be utilized for offline transactions (e.g., transactions in which a terminal authenticates the smart card at the terminal) and subsequent online transactions stemming from the offline transaction, while a dynamic identifier (e.g., a dynamic value) may be utilized for online authentication transactions for which no counterpart offline authentication is needed.

Before discussing detailed embodiments of the invention, some descriptions of certain terms may be useful.

A "computing device" (also referred to as a "user device") may be any suitable device that can perform computations, and that can communicate with other devices. A portable consumer device such as a smart card is an example of a computing device. Other types of computing devices may not be portable.

A "dynamic value" is intended to refer to a value that changes dynamically. The computing device can maintain various dynamic values. An example of a dynamic value is an application transaction counter (ATC). The ATC may initially be set by the issuer of the computing device (e.g., an authorizing entity) to a predetermined value. Thereafter, the ATC may be incremented with each transaction. Alternately, the ATC may be decremented from its initial predetermined value with each transaction. The ATC may be a value of any length. In addition, the issuer may maintain a corresponding ATC accessible to the issuer's computer. This corresponding ATC may be used to identify payment services which may have been replayed for fraudulent purposes. In an alternate embodiment, a cryptogram, digital signature, or hash value based on transaction data may be used in place of or in conjunction with the ATC stored at the computing device.

Examples of other dynamic values (e.g., data elements) may include a time of day, a current transaction amount, and a randomly generated number from a terminal, etc. The data elements are dynamic in the sense that they can change with each transaction or nearly each transaction. The dynamic data elements may relate to a user's computing device and/or may relate to the user generally.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An "authorizing entity computer" may be operated by, or on behalf of, an authorizing entity.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A "resource provider computer" may be any suitable computing device that may be operated by, or on behalf of, a resource provider.

A "processing network computer" (also referred to as a central server computer) may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a transaction processing computer may generate or forward the authorization response message to the resource provider.

A "primary account number" (PAN) may be an identifier for a payment account. A PAN may include a series of alphanumeric characters (e.g., 16). A PAN (or an obfuscated or encrypted version of the PAN) may be used to initiate, authorize, settle or resolve a payment transaction. In some embodiments, a PAN may be utilized for any type of transaction.

A "-account number" (SAN) may be another identifier for a payment account. A SAN may include a series of alphanumeric characters (e.g., 16). A SAN (or an obfuscated or encrypted version of the PAN) may be used to initiate, authorize, settle or resolve a transaction. In some embodiments, use of a SAN may be restricted to certain types of transactions. For example, a SAN may be utilized when the transaction includes a merchant of a particular type (e.g., a transit authority, a transit merchant, a sports stadium merchant, etc.), when the transaction is initiated by a terminal of a particular terminal type (e.g., a turnstile, etc.), and/or when the transaction is a particular type of transaction (e.g., a transit transaction, a fare checking transaction, etc.). In some embodiments, the SAN may be associated with a PAN and both may be associated with a particular user's account (e.g., a financial account maintained by an issuer on behalf of the user). In some embodiments, a PAN and the associated SAN each may include the same 8 left-most digits (e.g., corresponding to a bank identifier number (BIN)).

An "obfuscated identifier" may include an identifier that is an obfuscated version of an identifier (e.g., a 16 digit PAN). In some embodiments, an obfuscated identifier may be "format preserving" and may have a numeric format that conforms to the account identifiers used in existing transaction processing networks (e.g., ISO 8583 financial transaction message format). In some embodiments, an obfuscated identifier may be used in place of a PAN to initiate, authorize, settle or resolve a payment transaction or represent the original credential in other systems where the original credential would typically be provided.

An "encrypted identifier" may include any suitable encrypted value. An encrypted value may be generated from an identifier (e.g., a primary PAN) utilizing any suitable encryption techniques utilizing, for example, symmetric and/or asymmetric encryption techniques. In some embodiments, an encrypted identifier may be generated utilizing a primary PAN and a dynamic value, both stored at a user device.

For purposes of this application, "payment data" can include, with respect to financial applications those data elements used by the payment service to execute a transaction, and with respect to non-financial transactions any necessary data elements exclusive of the present invention. For example, when the payment service is a magnetic stripe credit card transaction, "payment data" would comprise Track 1 and/or Track 2 data, as that is understood by one of ordinary skill in the credit card industry, such as the primary account number, expiration date, service codes, and discretionary data. "Payment data" may also comprise a unique card identification number or a unique identification number for a service provider. The payment data may reside in a memory located on the user device (e.g., a credit and/or debit card, a smart card, etc.).

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of a system 100 for processing a transaction, according to some embodiments. The system 100 may be used to facilitate data communications between the various computers depicted in FIG. 1 for authentication and/or authorizing financial and non-financial transactions. The system 100 includes a user device 102, a resource provider computer 104, a transport computer 106, a central server computer 108, and an authorizing entity computer 110. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The resource provider computer 104 may be operated by or on behalf of a resource provider (e.g., a merchant, a transit system, etc.) and the transport computer may be associated with the resource provider. For example, the transport computer may be operated by an acquirer (e.g., a financial institution) responsible for managing an account associated with the resource provider. The authorizing entity computer 110 may be operated by an issuer (e.g., another financial institution). In some embodiments, entities are both acquirers and issuers, and embodiments of the invention include such entities.

The user device 102 may be in any suitable form. For example, the user device 102 can be hand-held and compact so that it can fit into a wallet and/or pocket. Examples of the user device 102 may include smart cards, credit and/or debit cards, key chain devices, or the like. Other examples of the user device 102 may include cellular phones, personal digital assistants (PDAs), pagers, payment cards, security cards, access cards, smart media, transponders, and the like. The user device 102 can also be a stored value card for storing retail store credit or the like.

The user device 102 may comprise a computer readable medium (CRM) 112 and a body 114. The CRM 112 may be on the body 114, which may in the form a plastic substrate, housing, or other structure. If the user device 102 is in the form of a card, it may have an embossed region 116 which is embossed with a personal account number (PAN). In some embodiments, the CRM 112 may store the PAN, and a secondary account number (e.g., a SAN), and/or a counter.

The computer readable medium 112 may be a memory that stores data and may be in any suitable form. Exemplary CRM 112 may be in the form of a magnetic stripe, a memory chip, etc. The computer readable medium 112 may electronically store the primary and/or an encrypted and/or obfuscated PAN in encrypted or unencrypted form.

The central server computer 108 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base 11 system which performs clearing and settlement services.

The central server computer 108 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The central server computer 108 may use any suitable wired or wireless network, including the Internet.

The resource provider computer 104 may also have, or may receive communications from, an access device 118 (e.g., a turnstile, a door, a point of sale terminal, etc.) that can interact with the user device 102. In FIG. 1, the access device 118 may be a component of the resource provider computer 104 and/or the access device 118 may be accessible by the resource provider computer and/or in communication with the resource provider computer 104. In some embodiments, the access device 118 could be located at any other suitable location in other embodiments of the invention. The resource provider computer 104 may include any suitable computational apparatus operated by a resource provider (e.g., a merchant). In some embodiments, the resource provider computer 104 may include one or more server computers that may host one or more websites associated with the resource provider (e.g., a merchant). In some embodiments, the resource provider computer 104 may be configured to send data to a central server computer 108 via a transport computer 106 as part of a payment verification and/or authentication process for a transaction between the user (e.g., consumer) and the resource provider. The resource provider computer 104 may also be configured to generate authorization request messages for transactions between the resource provider and the user 103, and route the authorization request messages to the authorizing entity computer 110 (e.g., via the transport computer 106 and/or the central server computer 108) for additional transaction processing.

The access devices according to embodiments of the invention can be in any suitable form. Examples of access devices include point of sale (POS) devices, turnstiles, doors, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

The access device 118 may include a reader 120, a processor 122, and a computer readable medium 124. The reader 120 may use any suitable contact or contactless mode of operation. For example, exemplary card readers can include RF (radio frequency) antennas, magnetic stripe readers, etc. to interact with the user device 102.

In at least one embodiment, the user 103 may initiate a purchase of a good or service at the resource provider computer 104 using the user device 102 (e.g., a credit card). The user device 102 can interact with an access device 118 such as a POS (point of sale) terminal. For example, the user 103 may take a credit card and may swipe it through an appropriate slot in the POS terminal. Alternatively, the POS terminal may be a contactless reader, and the user device 102 may be a contactless device such as a contactless card. During this interaction, the user device 102 may be configured to determine that the access device 118 is of a particular type of terminal (e.g., a POS device). Given that the access device 118 is of this particular type of terminal, the user device 102 may provide an obfuscated version of a primary PAN stored at the user device 102 and an encrypted version of the primary PAN to the access device 118.

An authorization request message may then forwarded to the transport computer 106. The transport computer 106 is typically associated with a business entity (e.g., a commercial bank) that has a business relationship with a particular resource provider (e.g., merchant) or other entity and that may be involved in the process of transaction. The transport computer 106 may issue and manage accounts for resource providers and exchange funds with the authorizing entity computer 110 on behalf of the resource provider. Some entities can perform both authorizing entity computer 110 and transport computer 106 functions. Embodiments of the present invention encompass such single entity issuer-acquirer computers. After receiving the authorization request message, the transport computer 106 may send the authorization request message to the central server computer 108. The central server computer 108 may then forward the authorization request message to the authorizing entity computer 110, or a third party entity acting on behalf of the authorizing entity, of the user device 102.

The central server computer 108 may be a network that includes or operates at least one server computer used for processing (e.g., payment processing). The server computer in the central server computer 108 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the central server computer 108 may operate multiple server computers. In such embodiments, each server computer may be configured to process transaction for a given region or handles transactions of a specific type based on transaction data.

The central server computer 108 may include data processing subsystems, networks, and operations used to support and deliver authorization services, exception file services, and clearing and settlement services. The central server computer 108 may include VisaNet™. Networks that include VisaNet™ are able to process credit card transactions, debit card transactions, and other types of commercial transactions. VisaNet™, in particular, includes an integrated payments system (integrated Payments system) which processes authorization requests and a Base II system, which performs clearing and settlement services. The payment processing network may use any suitable wired or wireless network, including the Internet.

The central server computer 108 may process transaction request messages and determine the appropriate destination (e.g., authentication computer(s)) for the transaction request messages. The central server computer 108 may also handle and/or facilitate the clearing and settlement of transactions.

The authorizing entity computer 110 is typically associated with a business entity (e.g., a bank) which issues and maintains consumer accounts for a consumer (e.g., the user 103). The authorizing entity computer 110 may issue payment devices for the consumer account, including credit cards and debit cards, and the like.

After the authorizing entity computer, or a third party entity acting on behalf of the authorizing entity, receives the authorization request message, the authorizing entity computer 110, or the third party entity acting on behalf of the issuer, may determine that a PAN is to be utilized for the transaction. For example, the authorizing entity computer 110 may determine that an obfuscated PAN is being utilized in the authorization request message, that a merchant type of the authorization request message indicates inclusion of a PAN, and/or that a transaction type of the authorization request message indicates inclusion of a PAN. In some embodiments, a PAN included in the authorization request message may be checked against a mapping of known secondary account identifiers (SANs) and if identified, the authorization request message may be declined. In some embodiments, if the PAN in the authorization request message is not included in a mapping of known SANs (e.g., it is not a SAN), the message may be processed further. Once it is determined that a PAN is being utilized, the authorizing entity computer may process the authorization request message to grant or decline the transaction. The authorizing entity computer may send an authorization response message back to the central server computer 108 to indicate whether or not the current transaction is authorized (or not authorized). The central server computer 108 then forwards the authorization response message back to the transport computer 106. The transport computer 106 then sends the response message back to the resource provider computer 104.

After the resource provider computer 104 receives the authorization response message, the access device 118 at the resource provider computer 104 may then provide the authorization response message for the user 103. The response message may be displayed by the access device 118, or may be printed out on a receipt.

At the end of the day, a normal clearing and settlement process can be conducted by the system 100. A clearing process is a process of exchanging financial details between and acquirer and an issuer to facilitate posting to a user's account and reconciliation of the user's settlement position.

In another exemplary embodiment, the user 103 may utilize user device 102 to initiate an offline transaction. For example, the user 103 may present user device 102 at an access device 118 having a particular terminal type (e.g., indicating a transit turnstile and/or fare checking device that allows/restricts access to a transit system). In some embodiments, the access device may be a contactless reader, and the user device 102 may be a contactless device such as a contactless card. In some embodiments, upon presenting the user device 102 the access device 118 may request authentication data from the user device 102. Due to the access device 118 being of a particular terminal type, the user device may provide information such as a SAN stored at the user device 102 in CRM 112. Additionally, the user device may provide an encrypted version of a PAN within the data provided to the access device 118.

After the authorizing entity computer, or a third party entity acting on behalf of the authorizing entity, receives the authorization request message, the authorizing entity computer 110, or the third party entity acting on behalf of the issuer, may be configured to determine that a SAN is included in the authorization request message. By way of example, the authorizing entity computer 110 may determine that a SAN is included in the authorization request message based at least in part on determining that the data in an account number field included in the message does not end in 7 zeros, determining that the requesting merchant is associated with a particular merchant type (e.g., a transit merchant type), and/or that the authorization request message indicates a type of transaction (e.g., a transit transaction) and/or a type of terminal (e.g., a transit terminal) from which the authorization request message was generated. The authorizing entity computer may be configured to decline any authorization request message that includes a SAN in transactions for which SAN usage are disallowed. If a SAN is included in a message for a transaction for which SANs are allowed (e.g., transit transactions, fare transactions, etc.), the authorization entity computer may proceed to process the authorization request message to approve or decline the transaction. The authorizing entity computer may send an authorization response message back to the central server computer 108 to indicate whether or not the current transaction is authorized (or not authorized). The central server computer 108 then forwards the authorization response message back to the transport computer 106. The transport computer 106 then sends the response message back to the resource provider computer 104.

In at least one embodiment, the authorizing entity may conduct a personalization process for the user device 102. During this personalization process, a master derivation key (MDK), a PAN, and a SAN may be stored at the user device 102 (e.g., within CRM 112). The user device 102 may be configured to perform functionality to derive one or more unique derivation keys from the master key. In some embodiments, the user device 102 may derive a UDK using the master key and at least a portion of the PAN. For example, the UDK may be derived using the master key and a left-most 8 digits of the PAN. In some embodiments, the left-most 8 digits of the PAN may be associated with a bank identification number (BIN).

Once generated, the UDK may be utilized at any suitable time to generate an encrypted identifier and/or an obfuscated identifier. In some embodiments, the UDK may encrypt the entire identifier (e.g., the PAN) as well as a dynamic value such as a counter, date, time, and/or transaction amount. By way of example, the PAN may be concatenated with a dynamic value (e.g., a transaction counter) stored on the user device 102 and encrypted using the UDK and an encryption algorithm. In some embodiments, a portion of the encrypted identifier (e.g., the right-most 7 digits) may be identified and used to generate an obfuscated identifier. In some embodiments, the obfuscated identifier may include the original 8 digits of the PAN (corresponding to a BIN), the portion of the encrypted identifier, and a checksum value (e.g., corresponding to a Luhn checksum). In still further embodiments, the obfuscated identifier may include the original 8 digits of the PAN (corresponding to a BIN), any suitable number of padding values (e.g., 7 zeros), and a checksum value. The obfuscated identifier and/or the encrypted identifier may be stored at the user device 102.

Upon initialization of a transaction (e.g., a non-transit transaction), or at another suitable time, the user device 102 may be configured to provide the obfuscated value and the encrypted identifier in the form of a data track. A data track can be formatted as a Track 1 or Track 2 data track. Track 1 ("International Air Transport Association") stored more information than Track 2, and contains the cardholder's name as well as account number and other discretionary data. This track is sometimes used by airlines when securing reservation with a credit card. Track 2 ("American Banking Association" (ABA)) is currently most commonly used. Track 2 may be read by ATMs and credit card checkers. The ABA designed the specifications of Track 2 and all world banks must abide by it. It contains the cardholder's account, an encrypted PIN, plus other discretionary data.

In some embodiments, the obfuscated value may be provided in a data field of the Track 2 data track traditionally including the user's account number (e.g., tag 57). In some embodiments, the encrypted identifier may be provided in a different portion of the Track 2 data track (e.g., in Tag 9F1F (Discretionary Data tag), in Tag 9F7C (Customer Exclusive Data Tag), in Tag 9F10 (Issuer Application Data), or in any suitable portion of the Track 2 data, or any suitable combination of the above).

In other embodiments, upon initialization of a transaction (e.g., a transit transaction), or at another suitable time, the user device 102 may be configured to provide the SAN and the encrypted identifier in the form of a data track. In some embodiments, the SAN may be provided in a data field of the Track 2 data track traditionally including the user's account number (e.g., tag 57). In some embodiments, the encrypted identifier may be provided in a different portion of the Track 2 data track (e.g., in Tag 9F1F (Discretionary Data tag), in Tag 9F7C (Customer Exclusive Data Tag), in Tag 9F10 (Issuer Application Data), or in any suitable portion of the Track 2 data, or any suitable combination of the above).

According to traditional transaction processing, the access device 118 may receive the Track 2 data track and provide the data to the resource provider computer 104 which may then forward at least a portion of the Track 2 data to the transport computer 106 via an authorization request message. In some embodiments, the access device 118 may generate the authorization request message, include at least a portion of the track 2 data and forward the authorization request message directly to the transport computer 106.

Upon receipt, or at another suitable time, the transport computer 106 may forward the authorization request message to the central server computer 108. The central server computer 108 may determine that the encrypted value is present in the authorization request message. The central server computer 108 may retrieve a stored UDK and/or derive the UDK utilizing the master derivation key and a portion of the obfuscated identifier (also included in the authorization message). The UDK may be utilized by the central server computer 108 to decrypt the encrypted value to obtain the entire unencrypted PAN. In some embodiments, the central server computer 108 may modify the authorization request message to include the unencrypted PAN and transmit the modified authorization request message to the authorizing entity computer 110 for further processing.

In other embodiments, the central server computer 108 and/or the authorizing entity computer 110 may utilize at least a portion of the obfuscated identifier (e.g., the first 8 digits corresponding to the BIN) to forward an unaltered authorization request message to the authorizing entity computer 110. The authorizing entity computer 110 may retrieve a stored UDK and/or derive the UDK utilizing the master derivation key and a portion of the obfuscated identifier or the SAN (also included in the authorization message). The UDK may be utilized by the authorizing entity computer 110 to decrypt the encrypted identifier to obtain the entire unencrypted PAN. The central server computer 108 and/or the authorizing entity may utilize the SAN to consult a mapping indicating known PAN/SAN associations in order to retrieve an associated PAN. The associated PAN may be compared to the unencrypted PAN to validate the authorization request message.

The authorizing entity computer 110 may process the authorization request message and transmit an authorization response message back to the central server computer 108. In some embodiments, the authorization response message may include the obfuscated identifier and the encrypted value and exclude the unencrypted identifier.

The central server computer 108 may forward the authorization response message back to the resource provider computer 104 via the transport computer 106. After the resource provider computer 104 receives the authorization response message, the access device 118 at the resource provider computer 104 may then provide the authorization response message for the user 103. The response message may be displayed by the access device 118, or may be printed out on a receipt.

At the end of the day, a normal clearing and settlement process can be conducted by the system 100.

By utilizing the techniques described herein, a more secure manner for communicating sensitive data (e.g., a PAN) is enabled. For transactions in which a static identifier is needed (e.g., to confirm or deny access based on a block list), a SAN may be utilized to perform the transaction. By utilizing the SAN and ensuring that the SAN may only be utilized in transactions of a particular type(s) (e.g., transit transactions, fare transactions, etc.) the SAN is protected from fraudsters. Even if a fraudster was able to eavesdrop to gain access to the SAN, the system would ensure that the SAN could only be utilized for certain types of transactions and no others. For other transactions (e.g., non-transit transactions), the PAN is encrypted and provided in a non-traditional data field, and the traditional data field which would normally include the PAN, instead includes an obfuscated value from which the PAN is unlikely to be determined. The obfuscated value may still include the original BIN ensuring that traditional routing techniques for the authorization request/response messages remain unchanged. The techniques described herein make it difficult, if not impossible, to identify the PAN from the authorization request/response messages. Additionally, in some embodiments, the PAN is encrypted using a dynamic value that is ever changing. Accordingly, the encrypted value and obfuscated value can change for each authorization request making it difficult, if not impossible, to track transactions for a particular user over time. Thus, utilizing the techniques discussed herein, privacy protection and security for transmitting sensitive data is improved.

Figure 2:
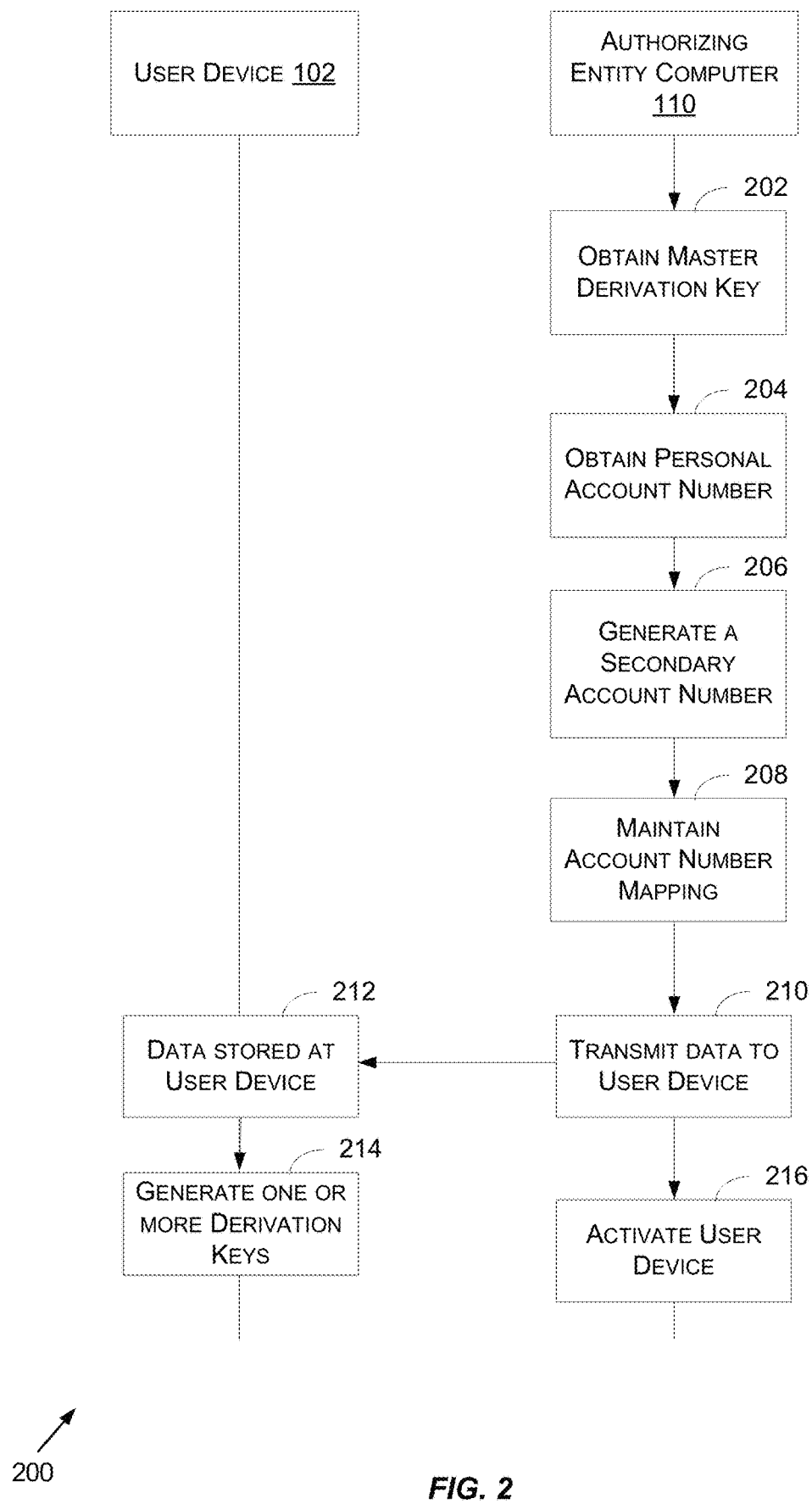
FIG. 2 depicts a method for generating and storing data at a user device, according to some embodiments.

FIG. 2 depicts a method 200 for generating and storing data at a user device (e.g., the user device 102 of FIG. 1), according to some embodiments. The method 200 may begin at 202, where an authorizing entity computer (e.g., authorizing entity computer 110) may obtain a master derivation key. In some embodiments, a master derivation key (MDK) may be utilized to derive one or more unique derivation keys. The authorizing entity computer 110 may ensure that the MDK for one user device is unique to that user device. Accordingly, the authorizing entity computer 110 may manage many master derivation keys that may correspond to various user devices (e.g., the user device 102).

At 204, the authorizing entity computer 110 may obtain a personal account number (PAN) corresponding to a user for which the user device is to be personalized. In at least one embodiment, the PAN may be associated with the user's financial account managed by the authorizing entity on behalf of the user.

At 206, the authorizing entity computer 110 may obtain and/or generate a secondary account number (SAN). As discussed throughout, the SAN may be restricted by the authorizing entity computer 110 such that the SAN may only be utilized in one or more particular types of transactions. By way of example, it may be the case that in transit systems, or fare checking systems, etc., a user must be authenticated quickly (e.g., in real-time or near real-time). Given the context of the system, it may not be possible to perform online authentication of the user quickly enough to enable access to a resource (e.g., a transit resource) in nearly real-time. Accordingly, some authentication systems perform an offline authentication at the access device and follow up later with an authorization request message to conduct a related transaction. This SAN may be generated to be utilized in such offline authentication scenarios.

At 208, the authorizing entity computer 110 may maintain an account number mapping indicating relationships between PANs and SANs. The authorizing entity computer 110 may be configured to utilize the mapping for validation purposes as discussed in more detail with respect to FIG. 5

At 210, the authorizing entity computer 110 may transmit data to the user device 102. By way of example, the authorizing entity computer 110 may transmit the MDK, the PAN, and the SAN to the user device 102. In some embodiments, the authorizing entity computer 110 may transmit the data to an intermediary device that may then transfer the data to the user device 102.

At 212, the data may be stored at the user device 102 within CRM 112. At 214, the user device 102 may generate one or more unique derivation keys using the MDK. By way of example, a unique derivation key (UDK) may be generated according to the process described in more detail in connection with FIG. 3. It should be appreciated that one or more UDKs may be generated and that each UDK may be utilized for a particular purpose. For example, a UDK may be generated for macing, another for encryption, another for cryptogram generation, and another UDK may be generated according to the process of FIG. 3. It should be appreciated that the user device 102 may generate at suitable number of UDKs, or such UDKs may instead be generated by the authorizing entity computer 110 at 202 or at any suitable time.

At 216, the user device 102 may be activated by the authorizing entity computer 110. Upon activation, the user device 102 may be utilized at an access device or online for performing a variety of transactions.

Figure 3:
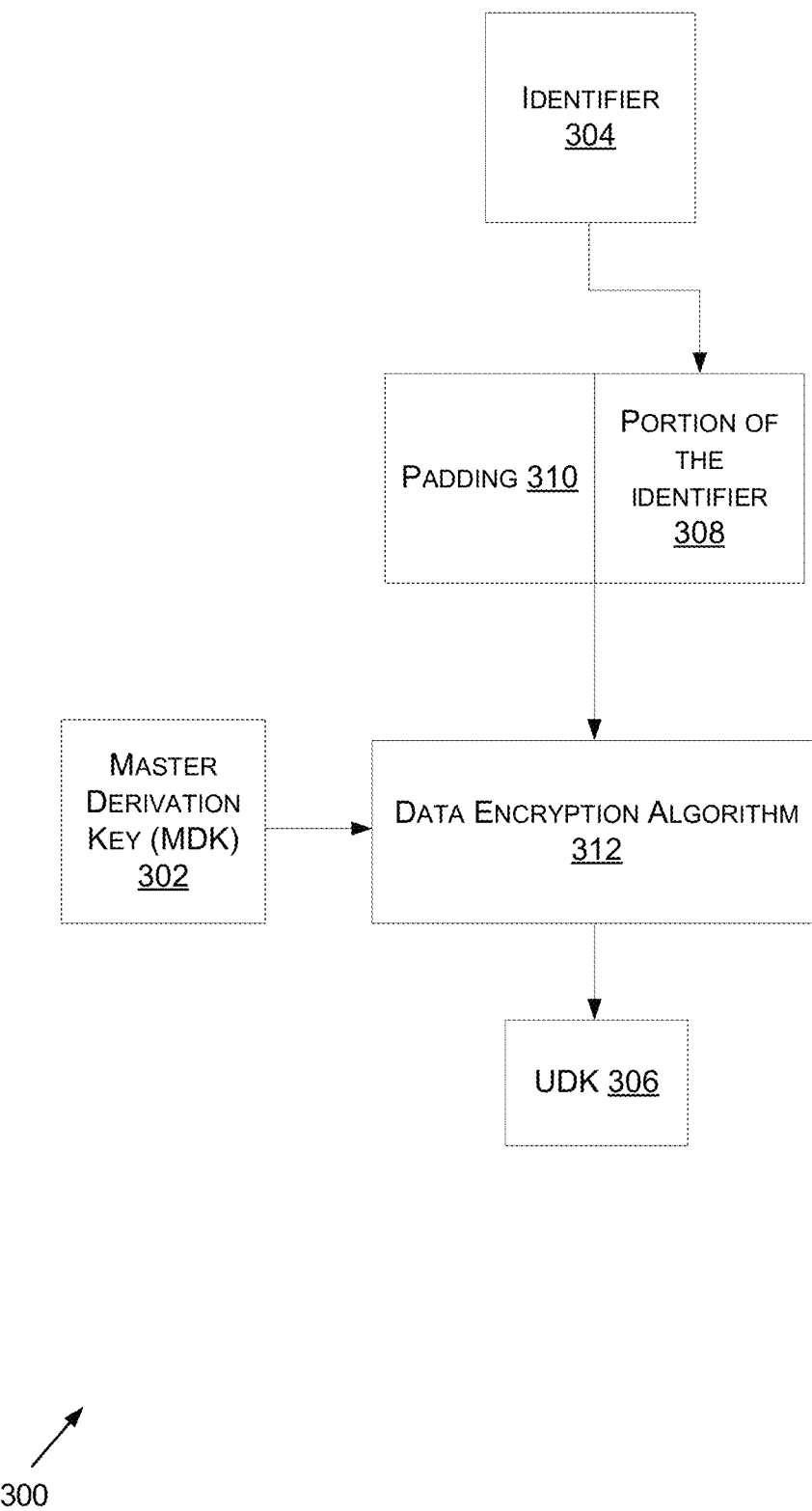
FIG. 3 depicts a method for generating a unique derived key from data residing on a computing device (e.g., a smart card), according to some embodiments.

FIG. 3 depicts a method for generating a unique derived key from data residing on a user device (e.g., a smart card), according to some embodiments. The method may be performed by the user device 102 of FIG. 1 utilizing one or more processors of the user device 102.

In at least one embodiment, the master derivation key (MDK) 302 and identifier 304 are stored at the user device 102 during performance of a personalization process (e.g., the method 200 of FIG. 2). In some embodiments, the identifier 304 may be an example of a personal account number. The UDK 306 may be derived from such data existing on the user device 102.

By way of example, the user device 102 may be configured to identify a portion of the identifier 308. In some embodiments, the portion of the identifier 308 may include less than the entire identifier 304. For example, the portion of the identifier 308 may include a left-most 8 digits of the identifier 304. In some embodiments, the left-most 8 digits of the identifier 304 may correspond to a bank identification number (BIN) that may be used for routing purposes within a payment processing network (e.g., system 100).

In some embodiments, the portion of the identifier 308 may be concatenated with a number of padded bits (e.g., padding 310) to create a string of predetermined fixed length. In some examples, the concatenated value may be 128 bits in length where the padding comprises 64 bits and the portion of the identifier 308 comprises another 64 bits (8 digits comprising 8 bits each), although the concatenated value is not limited to being this length. The concatenated value may be provided, along with the MDK 302 as input into a data encryption algorithm 312.

The data encryption algorithm 312 may include any suitable encryption methodology. For example, the data encryption algorithm 312 may utilize a triple-DES encryption algorithm. In some embodiments, the value resulting from the encryption conducted by the data encryption algorithm 312 is the UDK 306.

Figure 4:
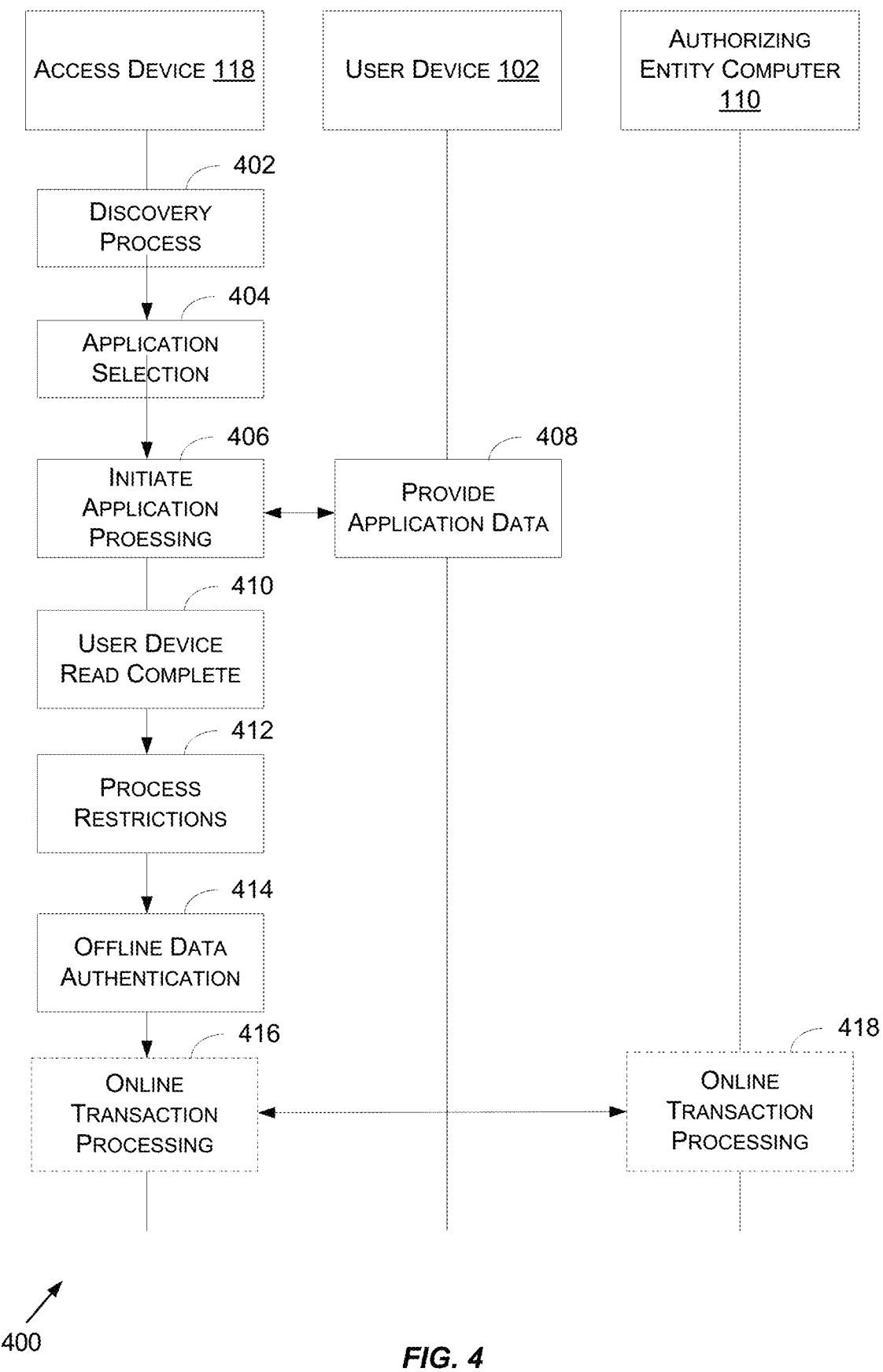
FIG. 4 depicts a method for performing offline authentication, according to some embodiments.

FIG. 4 depicts a method 400 for performing offline authentication, according to some embodiments. The method may begin at 402, where a discovery process may be executed by the access device 118. For example, the reader 120 of FIG. 1 may poll for the presence of contactless cards that may have entered the reader's RF field.

At 404, the access device 118 may initiate an application selection process with the user device 102. The application selection process may be performed immediately after activation of the user device 102 and is the process of determining which application of the applications that are supported by both the user device 102 and the access device 118 (or the reader 120) will be used to conduct the transaction. By way of example, the access device 118 (e.g., the reader 120 of the access device 118) may build a candidate list of mutually supported application. A single application from the candidate list may be identified and selected to process the transaction.

At 406, application processing may be initiated. For example, the access device 118 (or the reader 120) may signal to the user device 102 that transaction processing is beginning. In some embodiments, the beginning of transaction processing may be signaled by sending a GET PROCESSING OPTIONS command from the access device 118 (the reader 120) to the user device 102. When issuing this command, the access device 118 may provide any suitable data elements. In some embodiments, the contactless path(s) that are mutually supported by the user device 102 and the access device 118 (the reader 120) may be determined and a contactless path chosen to process the transaction. Subsequent transaction processing may be performed in accordance with the contactless path chosen.

At 408, the user device 102 may provide application data back to the access device 118 (the reader 120). In some embodiments, the user device 102 may first receive the GET PROCESSING OPTIONS. In response to the command, the user device 102 may generate any suitable application data. By way of example, a counter stored at the user device 102 may be modified (e.g., incremented, decremented, etc.). The user device 102 may utilize the counter along with a stored PAN to generate an encrypted PAN that may also be stored at the user device 102. If the GET PROCESSING OPTIONS command indicates that the access device 118 is a particular terminal type (e.g., a non-transit terminal type, or a terminal type of a first set of terminal types stored at the user device, etc.) the user device 102 may generate an obfuscated PAN from a portion of the stored PAN and a portion of the encrypted identifier. The obfuscated PAN and the encrypted identifier may be provided as application data in this use case. However, if the GET PROCESSING OPTIONS command indicates that the access device 118 is another particular terminal type (e.g., a transit terminal type, or a terminal type of a second set of terminal types stored at the user device, etc.) the user device 102 may provide the stored SAN and the encrypted identifier as application data.

At 410, when the access device 118 (the reader 120) has read the application data necessary in order to process the transaction, the read of the application data may be considered complete. During read time, the access device 118 may determine whether all mandatory data elements for the transaction were returned by the card. The access device 118 (the reader 120) may terminate the transaction if all mandatory data elements were not returned or if a redundant data was returned (e.g., more than one occurrence of a data element was returned).

At 412, the access device 118 (the reader 120) may process restrictions. By way of example, the access device 118 (the reader 120) may check the application expiration date, application usage, and/or may whether the SAN is on the Terminal Exception File (TEF). The TEF may be considered a black list in which SANs that are not to be allowed access to a resource are stored. If a SAN appears in the Terminal Exception File, the access device 118 (the reader 120) may be configured to deny the user device 102 access (e.g., to a turnstile managed by the access device 118) and no further processing may take place.

If however, the SAN is not included in the TEF, the method 400 may proceed to 414, where offline data authentication may be executed. Offline Data Authentication may be implemented for the access devices (readers) supporting offline transactions, and may be performed for user devices requested offline transactions. During Offline Data Authentication, the access device 118 (the reader 120) may verify the dynamic signature returned by the user device 102 and may authenticate the data from the user device 102.

In some embodiments, the access device 118 (the reader 120) may support online transactions. In these embodiments, the access device 118 (the reader 120) may send an authorization request message to the authorizing entity computer 110 (e.g., via the transport computer 106 and/or the central server computer 108 of FIG. 1) at 416. The authorization request message may include the SAN and the encrypted identifier stored at the user device 102.

Upon receipt of the authorization request message at 418, or at any suitable time, the authorizing entity computer 110 reviews and authorizes or declines the transaction using predetermined host-based risk management parameters. In some embodiments, the authorizing entity computer 110 may be configured to determine that the transaction includes a SAN. In some embodiments, the value of an account identifier field of the authorization request message may be retrieved and compared to a mapping including all known SANs which are mapped to corresponding PANs. If the value of the account identifier field is equal to a known SAN, the transaction may be determined to be utilizing a SAN. In some embodiments, the authorizing entity computer 110 may be configured to allow a SAN to be utilized only in transactions in which the access device initiating the transaction (e.g., the access device 118) is of a particular type, or the merchant associated with the access device is a particular merchant type, or a transaction type of the authorization request message indicates an allowable transaction type. As a non-limiting example, the authorizing entity computer 110 may be configured to reject online processing utilizing a SAN in transactions that involve an access device that is associated with a non-transit terminal type (e.g., access devices operated by non-transit merchants) while allowing online processing utilizing a SAN for transactions that involve an access device that is associated with a transit terminal type (e.g., access device 120 operated by a transit merchant).

In some embodiments, the SAN included in the authorization request message may be associated with a PAN corresponding to the encrypted identifier. The authorizing entity computer 110 may be configured to retrieve the 8 left-most digits of the SAN corresponding to a bank identification number (BIN). The authorizing entity computer 110 may derive a UDK utilizing the BIN and a PAN associated with the SAN as stored in a mapping maintained by the authorizing entity computer 110. Using the derived UDK, the authorizing entity computer 110 may decrypt the encrypted identifier of the authorization message to determine a decrypted PAN. The decrypted PAN may be compared to the PAN stored in the mapping and associated with the SAN of the message. If the decrypted PAN matches the stored PAN, the message may be considered valid, and invalid if otherwise. The authorizing entity computer 110 may further perform traditional online fraud and credit checks, perform online card authentication utilizing a card-generated cryptogram, or the like.

Figure 5:
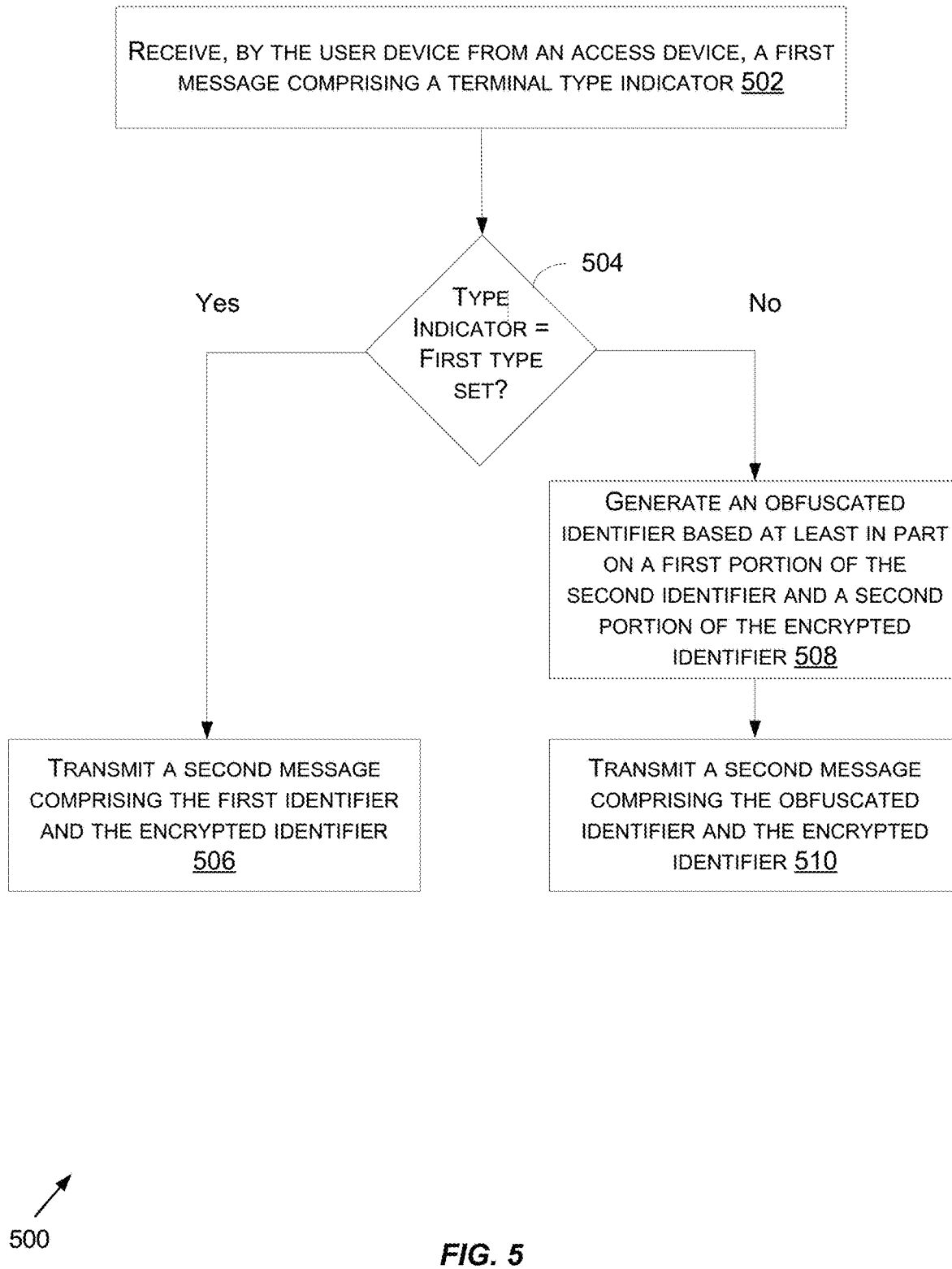
FIG. 5 shows a flowchart for a method for securely communicating sensitive data, according to some embodiments.

FIG. 5 shows a flowchart for a method 500 for securely communicating sensitive data, according to some embodiments. The method 500 may be performed by a computing device (e.g., the user device 102 of FIG. 1, a smart card). The computing device may comprise one or more processors and one or more memories storing computer-executable instructions, wherein executing the computer-executable instructions by the one or more processors, causes the computing device to perform the method 500. The steps shown in FIG. 5 and described below can be used in conjunction with the description of the transaction processing in FIG. 1 and its corresponding description. Those descriptions are herein incorporated by reference. The computing device may store one or more UDKs, a first identifier (e.g., a secondary account number (SAN)) a second identifier (e.g., a primary account number (PAN)), a dynamic value, or any suitable data within memory of the computing device.

An encrypted identifier may be generated (e.g., by the computing device) at any suitable type (e.g., after receiving the GET PROCESSING OPTIONS command from an access device as discussed above in connection with FIG. 4). The computing device may generate encrypted identifier by encrypting the second identifier (e.g., the PAN) and a dynamic value (e.g., a counter, a date, a time, etc.) using a unique derivation key (e.g., the UDK 206). In some embodiments, the second identifier and the dynamic value may be concatenated together and/or with additional padding values prior to being encrypted. In some embodiments, the encrypted identifier may be stored at the computing device (e.g., as part of Track 1 and/or Track 2 data such as Tag 9F7C (Customer Exclusive Data Tag) and/or Tag 9F10 (Issuer Application Data), in Tag 9F1F (Discretionary Data tag), or in any portion of the Track 1 and/or Track 2 data, or any suitable combination of the above. Additionally, or alternatively, the encrypted identifier may be provided as part of a data field reserved for future use potentially available in any of the Tags described above or another suitable portion of the Track 1 and/or Track 2 data.

The method 500 may begin at block 502, where a request message may be received by the computing device (e.g., a smart card) from an access device (e.g., a turnstile). In some embodiments, the request message may correspond to a GET PROCESSING OPTIONS command as described above in FIG. 4. The access device may be any suitable device configured to request data from a user device.

At 504, the computing device may determine a type indicator for a requesting access device based at least in part on the request message. By way of example, the request message may include a type indicator that indicates the request was initiated by a particular type of terminal/access device. As a non-limiting example, the request message may indicate that the requesting device is a turnstile within a transit system such as a subway system. The computing device may determine whether or not the type indicator belongs to a first type set (e.g., the first type set including a transit type).

At 506, if the type indicator was determined to be included in a first type set or it is determined that the request message was initiated by a particular type of terminal/access device, the computing device may transmit a second message (e.g., to the access device) that comprises at least the first identifier (e.g., the SAN) and the encrypted identifier generated/derived from the PAN. According to some embodiments, the message may be provided to an access device, which causes the user of the computing device to be allowed or denied access to a resource. As a non-limiting example, an access device, such as a turnstile in a transit station, may allow or deny access to the user based on the first identifier (e.g., the SAN). As described above in connection with FIG. 4, in some embodiments, the access device (or an associated resource provider computer) may subsequently generate an authorization request message. The authorization request message may comprise, among other things, a first data field comprising the first identifier (the SAN) and a second data field comprising the encrypted identifier. In some embodiments, the authorization request message is transmitted a central server computer (e.g., the central server computer 108 of FIG. 1) for further authorization processing.

At 508, if the type indicator was determined not to be included in the first type set or is determined not to be the particular type of terminal/access device, an obfuscated identifier may be generated (e.g., by the user device 102). In some embodiments, the obfuscated identifier may include the first 8 digits of the second identifier (the PAN), 7 zeros, and a Luhn checksum value. In other embodiments, the obfuscated identifier may be generated based at least in part on the portion of the second identifier (e.g., the PAN) and a portion of the encrypted identifier. By way of example, the obfuscated identifier may be generated to include a first 8 digits of the identifier and the last 7 digits of the encrypted identifier (or any suitable number of zeros). This is merely an example, more or fewer digits of the identifier and more or fewer digits of the encrypted identifier may be utilized. Similarly, the obfuscated may include 16 digits or any suitable number of digits. In some embodiments, a Luhn checksum value may be computed from the obfuscated identifier and included as part of the obfuscated identifier (e.g., the last digit, digit 16 in the ongoing example).

At 510, a second message (e.g., a Track 2 message) may be provided (e.g., by the user device 102). In some embodiments, the message may comprise at least the obfuscated identifier and the encrypted identifier. According to some embodiments, the message may be provided to an access device (e.g., the access device 118), which causes an authorization request message to be generated (e.g., by the access device 118 and/or the resource provider computer 104 of FIG. 1). The authorization request message may comprise, among other things, a first data field comprising the obfuscated identifier and a second data field comprising the encrypted identifier. In some embodiments, the authorization request message is transmitted a central server computer (e.g., the central server computer 108 of FIG. 1) for further authorization processing.

Figure 6:
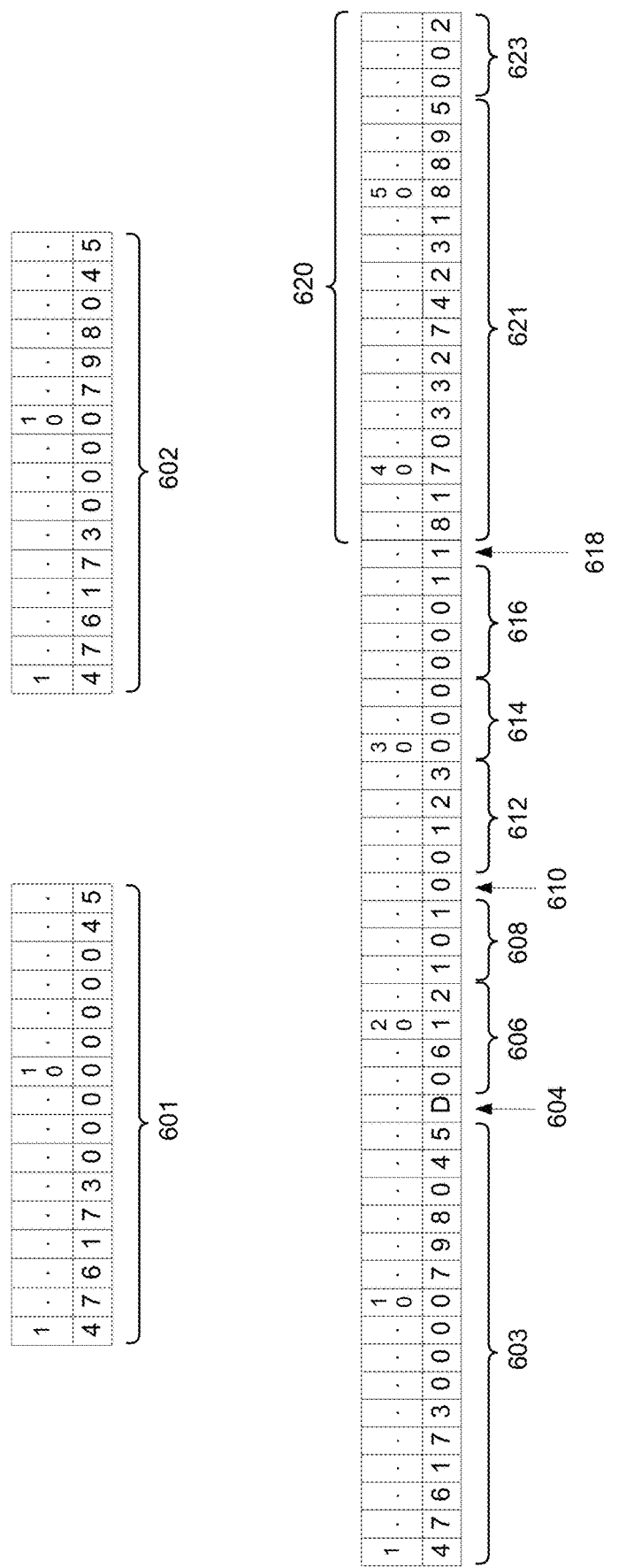
FIG. 6 depicts an exemplary record format for use in some embodiments.

FIG. 6 depicts an exemplary record format 600 for use in some embodiments. For example, the record format 600 may include track 2 data (e.g., authentication data) including a SAN and an encrypted identifier. The record format 600 may be an example of the second message described in connection with 506 of FIG. 5. In one non-limiting example, the PAN 601 may be associated with a user and stored on the user's device (e.g., a smartcard). In some embodiments, a SAN 602 may be associated with the user and stored on the user's device. As illustrated in FIG. 6, the PAN 601 and the SAN 602 may each include 16 digits. In some embodiments, the PAN 601 is stored at Tag 57 of the Track 2 data as defined by the Track 2 data. In some embodiments, the SAN 602 is stored at Tag 5A of the Track 2 data as defined by the Track 2 data.

The first 16 digits (e.g., a identifier data field 603) of the record format 600 (e.g., digits 1-16) may traditionally be reserved for the SAN 602. Next, a separator data field 604 provides a buffer between the account identifier and the expiration date data field 606. A service code data field 608 may follow the expiration date data field 606. A personal identification number verification indicator (PVKI) data field 610 and a PIN verification information data field 614 follow. Next, a dCVV data field 614, a transaction counter data field 616, and a contactless indicator data field 618 are included. Finally, a discretionary data field 620 follows. The discretionary data field may include an encrypted value data field 621 and a cryptogram version number data field 623. The encrypted value data field 621 and a cryptogram version number data field 623 may include any suitable number of digits, not necessary the number depicted in FIG. 6.

According to some embodiments, the PAN 601 may first be utilized to generate an encrypted value (e.g., an encrypted identifier). By way of example, the user device 102 of FIG. 1 may be configured to retrieve the PAN 601 and the UDK 306 of FIG. 3 from storage. In some embodiments, a transaction counter (or other dynamic value) may also be retrieved. The PAN and the transaction counter (or other dynamic value) may be utilized together with the UDK 306 as input into an encryption algorithm to generate an encrypted value. In some embodiments, the PAN and the transaction counter (or other dynamic value) may be concatenated prior to input. The resultant encrypted value may be stored with the record format 600. By way of example, the resultant encrypted value may be stored as depicted within the encrypted value data field 621 of the discretionary data field 620. In some embodiments, discretionary data field 620 corresponds to a particular tag defined by the Track 2 standard (e.g., in Tag 9F1F (Discretionary Data tag), Tag 9F7C (Customer Exclusive Data Tag), in Tag 9F10 (Issuer Application Data), in any suitable portion of the Track 2 data, or any suitable combination of the above).

In some embodiments, the cryptogram version number data field 623 may store a number indicating that the discretionary data field 620 includes the encrypted value within the encrypted value data field 621.

According to some embodiments, the user device 102 may be configured to provide the SAN 602 in the identifier data field 603. Digit 16 of the identifier data field 603 may include a checksum value (e.g., a Luhn checksum/value) that may be utilized (e.g., on receipt) for verifying that the identifier data field 603 has not been altered. In some embodiments, the SAN 602 may be provided within the identifier data field 603 when the user device 102 has determined that a requestor of Track 2 data is associated with a particular terminal type (e.g., a transit terminal type, a terminal type associated with offline authentication, etc.).

Once a transaction has been initiated, the SAN 602 contained within the identifier data field 603 and the encrypted value within discretionary data field 620 (e.g., at encrypted value data field 621) may be provided (e.g., to an access device as described above). In some embodiments, the transaction counter can be incremented (or decremented) and/or a new dynamic value may be generated and stored in transaction counter data field 716. Should another transaction be initiated by the user device 102, the process discussed herein may be repeated utilizing the new transaction counter/dynamic value and the PAN 701 to generate a new encrypted value and a new obfuscated identifier which may then be provided in the subsequent transaction.

Figure 7:
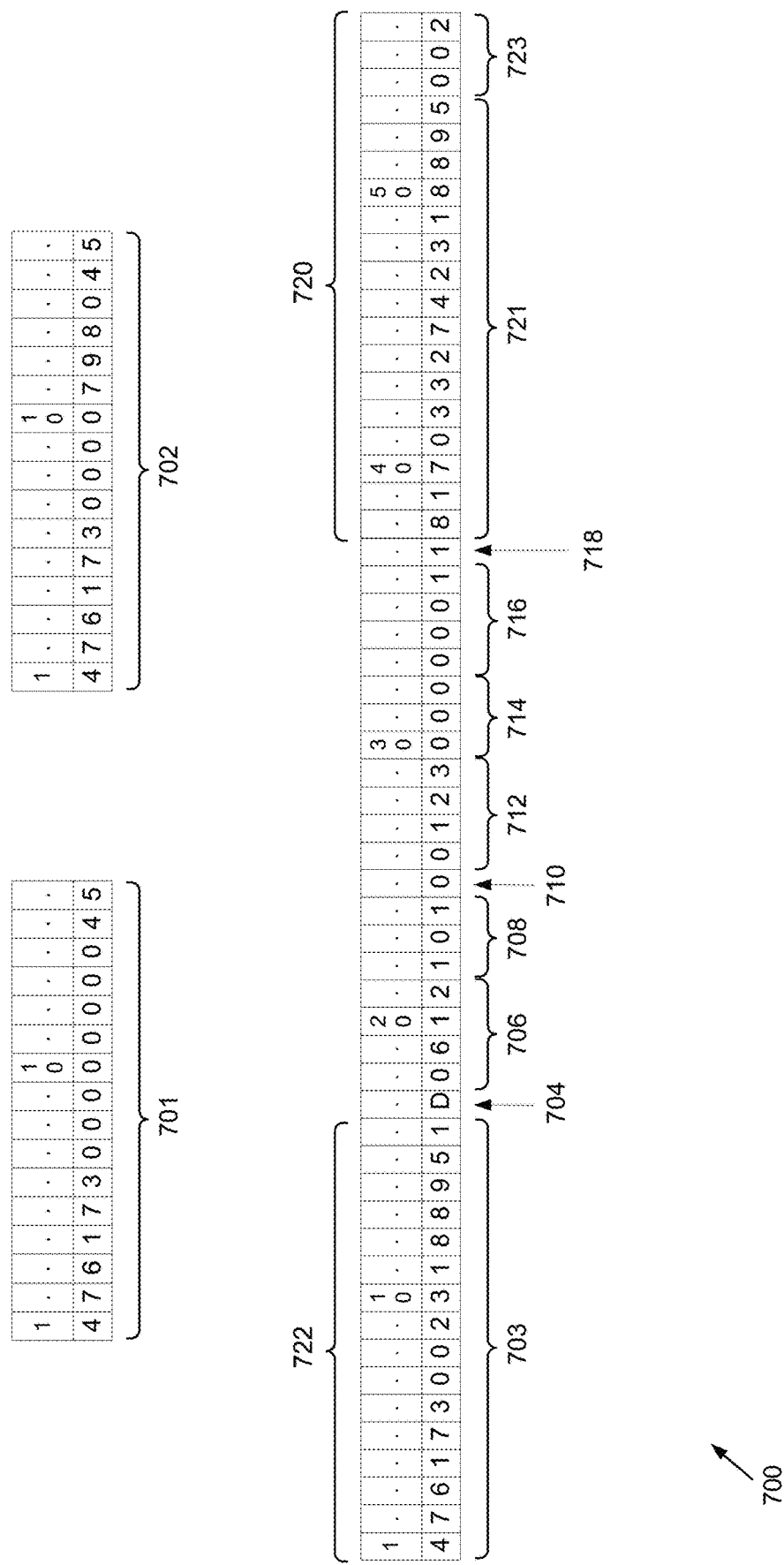
FIG. 7 depicts another exemplary record format for use in some embodiments.

FIG. 7 depicts another exemplary record format 700 for use in some embodiments. For example, the record format 700 may include track 2 data (e.g., payment data) including an obfuscated identifier and an encrypted identifier. The record format 600 may be an example of the second message described in connection with 510 of FIG. 5. In one non-limiting example, the PAN 701 may be associated with a user and stored on the user's device (e.g., a smartcard). In some embodiments, a SAN 702 may also be associated with the user and stored on the user's device. As illustrated in FIG. 7, the PAN 701 and the SAN 702 may each include 16 digits. In some embodiments, the PAN 701 is stored at Tag 57 of the Track 2 data as defined by the Track 2 data. In some embodiments, the SAN 702 may be stored at Tag 5A of the Track 2 data as defined by the Track 2 data.

The first 16 digits (e.g., a identifier data field 703) of the record format 700 (e.g., digits 1-16) may be reserved for an obfuscated version of the account identifier (e.g., obfuscated PAN 703, an obfuscated version of the PAN 701). Next, a separator data field 704 provides a buffer between the account identifier and the expiration date data field 706. A service code data field 708 may follow the expiration date data field 706. A personal identification number verification indicator (PVKI) data field 710 and a PIN verification information data field 712 follow. Next, a dCVV data field 714, a transaction counter data field 716, and a contactless indicator data field 718 may be included. Finally, a discretionary data field 720 may follow. The discretionary data field may include an encrypted value data field 721 and a cryptogram version number data field 723. The encrypted value data field 721 and a cryptogram version number data field 723 may include any suitable number of digits, not necessary the number depicted in FIG. 7.

According to some embodiments, the PAN 701 may first be utilized to generate an encrypted value (e.g., an encrypted identifier). By way of example, the user device 102 of FIG. 1 may be configured to retrieve the PAN 701 and the UDK 306 of FIG. 3 from storage. In some embodiments, a transaction counter (or other dynamic value) may also be retrieved. The PAN 701 and the transaction counter (or other dynamic value) may be utilized together with the UDK 306 as input into an encryption algorithm to generate an encrypted value. In some embodiments, the PAN 701 and the transaction counter (or other dynamic value) may be concatenated prior to input. The resultant encrypted value may be stored with the record format 700. By way of example, the resultant encrypted value may be stored as depicted within the encrypted value data field 721 of the discretionary data field 720. In some embodiments, discretionary data field 720 corresponds to a particular tag defined by the Track 2 standard (e.g., in Tag 9F1F (Discretionary Data tag), Tag 9F7C (Customer Exclusive Data Tag), in Tag 9F10 (Issuer Application Data), in any suitable portion of the Track 2 data, or any suitable combination of the above).

In some embodiments, the cryptogram version number data field 723 may store a number indicating that the discretionary data field 720 includes the encrypted value within the encrypted value data field 721.

According to some embodiments, the user device 102 may be configured to generate the obfuscated PAN 703. By way of example, the user device 102 may obtain the first 8 digits of the PAN 701 and store this information in digits 1-8 of the identifier data field 703. In some embodiments, digits 9-15 of the identifier data field 703 may include padding values such as zeros. Alternatively, the user device 102 may be configured to obtain some portion of the encrypted value and store the portion within the record format 700. For example, the last 7 digits of the encrypted value may be obtained and stored as digits 9-15 of the identifier data field 703. Digit 16 of the identifier data field 703 may include a checksum value (e.g., a Luhn checksum/value) that may be utilized (e.g., on receipt) for verifying that the identifier data field 703 has not been altered.

Once a transaction has been initiated, the obfuscated PAN 703 and the encrypted value within discretionary data field 720 (e.g., at encrypted value data field 721) may be provided (e.g., to an access device as described above). The transaction counter can be incremented (or decremented) and/or a new dynamic value may be generated and stored in transaction counter data field 716. Should another transaction be initiated by the user device 102, the process discussed herein may be repeated utilizing the new transaction counter/dynamic value and the PAN 701 to generate a new encrypted value and a new obfuscated identifier which may then be provided in the subsequent transaction.

Figure 8:
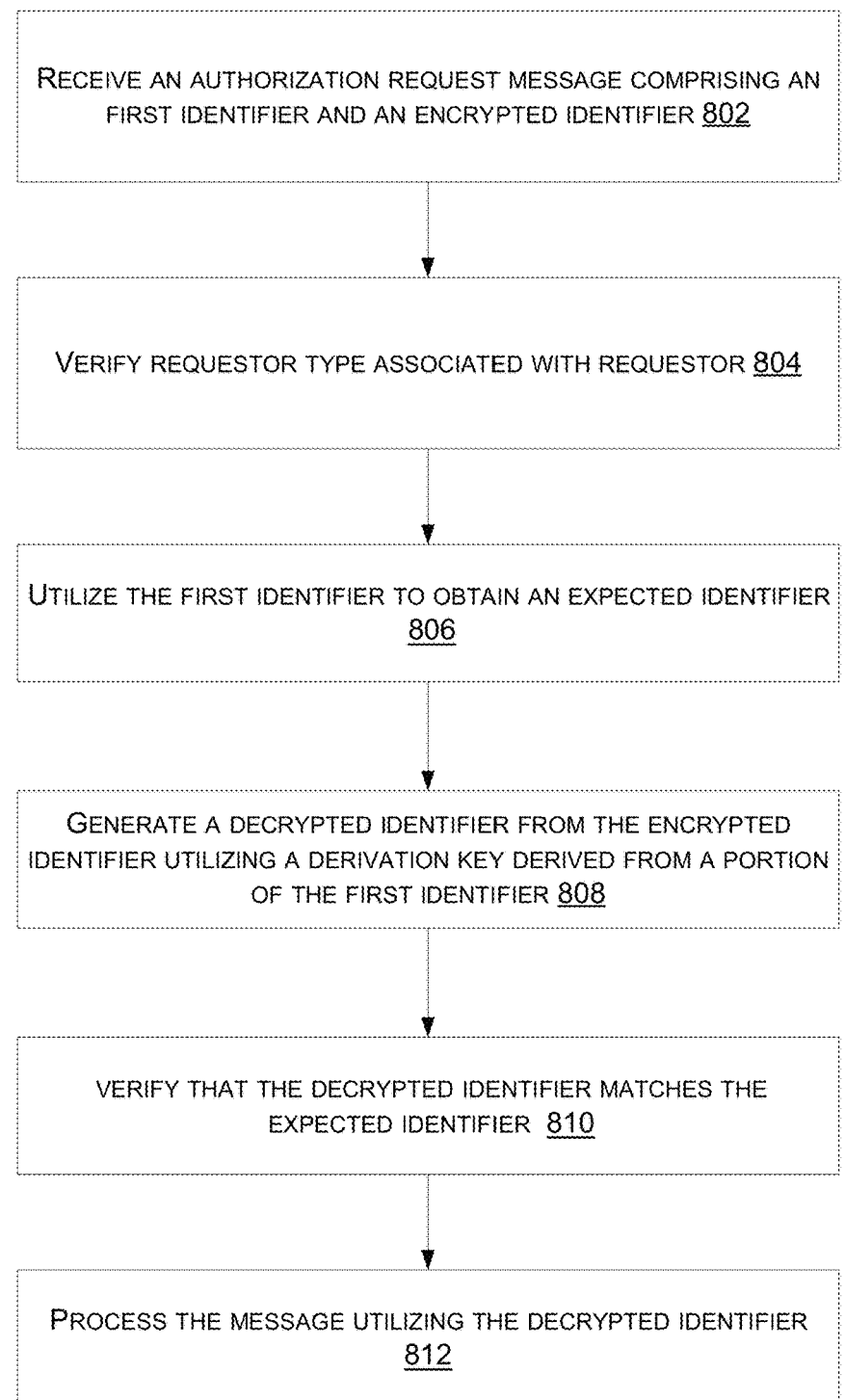
FIG. 8 shows a flowchart for a method for performing data verification, according to some embodiments.

FIG. 8 shows a flowchart for a method for performing data verification, according to some embodiments. The method 800 may be performed by a computing device (e.g., the central server computer 108 and/or the authorizing entity computer 110 of FIG. 1). The computing device may comprise one or more processors and one or more memories storing computer-executable instructions, wherein executing the computer-executable instructions by the one or more processors, causes the computing device to perform the method 800.

The method 800 may begin at block 802, where a message (e.g., an authorization request message) may be received. In some embodiments, the message may comprise a first identifier (e.g., a SAN) and an encrypted identifier. The steps shown in FIG. 8 and described below can be used in conjunction with the description of the transaction processing in FIG. 1 and its corresponding description. Those descriptions are herein incorporated by reference.

At block 804, the computing device may verify a type associated with the requesting device that initiated the authorization request message. In some embodiments, the computing device may compare a value contained in the authorization request message (e.g., a merchant name, an address, a type indicator, a terminal type, etc.) to data stored at, or accessible to, the computing device (e.g., values for which utilization of a SAN is allowed). If the value contained in the authorization request message is contained in the stored data, the computing device may allow the authorization request message to be processed further. If the value is not contained in the authorization request message, the computing device may decline the authorization request message and transmit an authorization response message to the requestor indicating the same.

At 806, the first identifier (e.g., the SAN) may be utilized to obtain an expected identifier (e.g., a primary PAN). In some embodiments, the computing device may consult a mapping that indicates known associations between PANs and SANs.

At 808, the computing device may generate a decrypted identifier utilizing the encrypted identifier and a unique derivation key. In some embodiments, the computing device may derive the unique derivation key (UDK) from a portion of the first identifier (e.g., the SAN). In some embodiments, the UDK may be previously derived and retrieved from storage. By way of example, the computing device may retrieve a left-most 8 digits of the first identifier and use those digits as input into a predetermined encryption algorithm to generate the UDK. The left-most 8 digits may correspond to a bank identification number (BIN). Once the UDK has been generated, it may be utilized to decrypt the encrypted identifier.

At 810, the computing device may be configured to verify that the decrypted identifier matches the expected identifier 510. That is, that the decrypted identifier corresponds to a primary PAN associated with the first identifier (e.g., a SAN) as defined within the mapping maintained by the computing device.

At 812, the message may be processed by the computing device utilizing the decrypted identifier. By way of example, the computing device may be a central server computer (e.g., the central server computer 108 of FIG. 1). In this scenario, processing the message (e.g., an authorization request message) may include modifying the message to include the decrypted identifier and transmitting the message to an authorizing entity computer (e.g., the authorizing entity computer 110) for further processing. In some embodiments, the computing device may be the authorizing entity computer 110. In this scenario, processing the message may include authorizing the transaction with the message data including the decrypted identifier. The processing may further include generating an authorization response message indicating that the transaction was approved or declined. The authorization response message may include the encrypted identifier and transmitted, for example, to the central server computer 108 according to the process described above in connection with FIG. 1.

Figure 9:
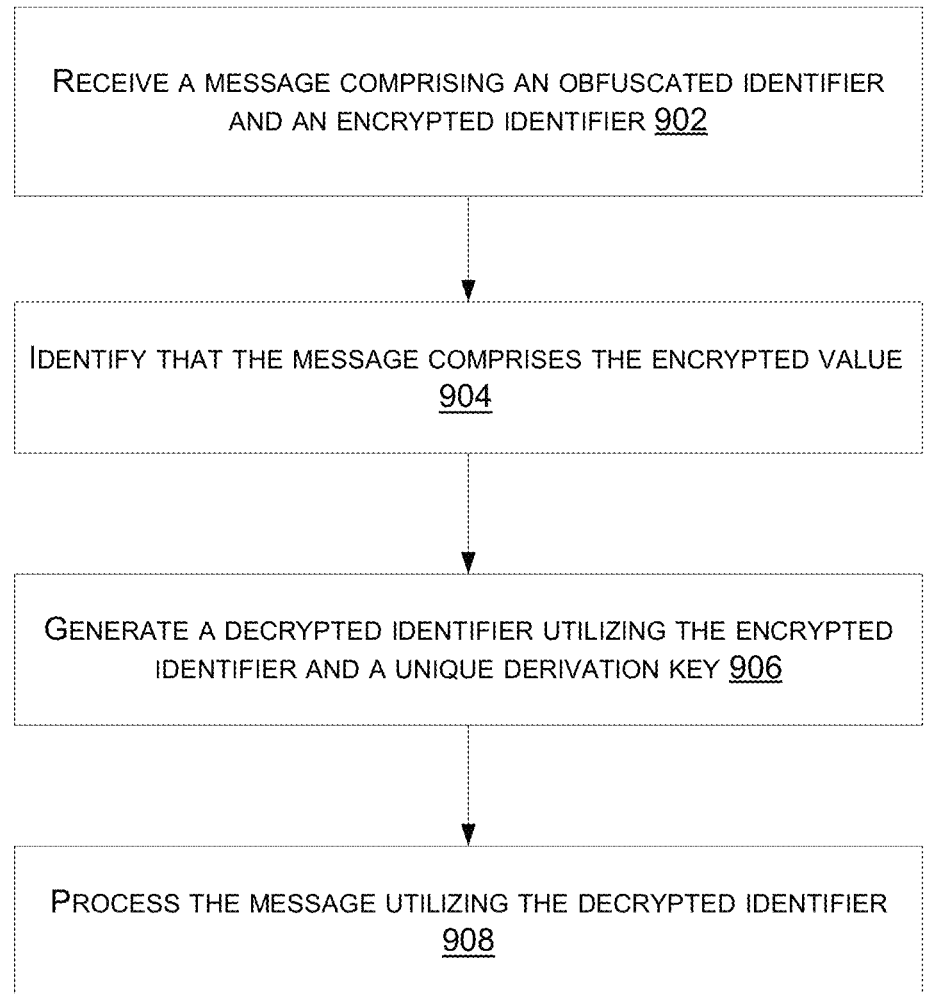
FIG. 9 shows a flowchart for another method for performing data verification, according to some embodiments.

FIG. 9 shows a flowchart for another method for performing data verification, according to some embodiments. The method 900 may be performed by a computing device (e.g., the central server computer 108 and/or the authorizing entity computer 110 of FIG. 1). The computing device may comprise one or more processors and one or more memories storing computer-executable instructions, wherein executing the computer-executable instructions by the one or more processors, causes the computing device to perform the method 900.

The method 900 may begin at block 902, where a message (e.g., an authorization request message) may be received. In some embodiments, the message may comprise an obfuscated identifier and an encrypted identifier. The steps shown in FIG. 9 and described below can be used in conjunction with the description of the transaction processing in FIG. 1 and its corresponding description. Those descriptions are herein incorporated by reference.

At block 904, the computing device may identify that the message comprises the encrypted identified. In some embodiments, identifying that the message comprises the encrypted identifier may include checking a particular data field (e.g., the discretionary data field 320 of FIG. 3) for a non-zero value. If the data field contains a non-zero value, the computing device may conclude that the encrypted value is present in the message. In some embodiments, identifying that the message comprises the encrypted identifier may include checking a particular data field (e.g., the cryptogram version number data field 323 of FIG. 3) for a non-zero value (or a particular value).

At block 906, the computing device may generate a decrypted identifier utilizing the encrypted identifier and a unique derivation key. In some embodiments, the computing device may derive the unique derivation key (UDK) from a portion of the obfuscated identifier. In some embodiments, the UDK may be previously derived and retrieved from storage. By way of example, the computing device may retrieve a left-most 8 digits of the obfuscated identifier and use those digits as input into a predetermined encryption algorithm to generate the UDK. Once the UDK has been generated, it may be utilized to decrypt the encrypted identifier.

At block 908, the message may be processed by the computing device utilizing the decrypted identifier. By way of example, the computing device may be a central server computer (e.g., the central server computer 108 of FIG. 1). In this scenario, processing the message (e.g., an authorization request message) may include modifying the message to include the decrypted identifier and transmitting the message to an authorizing entity computer (e.g., the authorizing entity computer 110) for further processing. In some embodiments, the computing device may be the authorizing entity computer 110. In this scenario, processing the message may include authorizing the transaction with the message data including the decrypted identifier. The processing may further include generating an authorization response message indicating that the transaction was approved or declined. The authorization response message may include the encrypted identifier and transmitted, for example, to the central server computer 108 according to the process described above in connection with FIG. 1.

Technical Improvements

By utilizing the techniques described herein, a more secure manner for communicating sensitive data (e.g., a PAN) is enabled. Not only is the PAN encrypted and provided in a non-traditional data field, but the traditional data field which would normally include the PAN, instead includes an obfuscated value from which the PAN is unlikely to be determined. The obfuscated value still may include the original BIN ensuring that traditional routing techniques for the authorization request/response messages remain unchanged. The techniques described herein make it difficult, if not impossible, to identify the PAN from the authorization request/response messages. Additionally, in some embodiments, the PAN is encrypted using a dynamic value that is ever changing. Accordingly, the encrypted value can change for each authorization request making it difficult, if not impossible, to track transactions for a particular user over time. Accordingly, these methods provide improvements regarding personal data privacy by ensuring that a particular user and/or account cannot be identified from the authorization request/response message.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method for communicating sensitive data, comprising:
transmitting, by an access device to a user device, a first message comprising a terminal type indicator, the user device storing a static account identifier, a primary account identifier, and an encrypted identifier that is generated by the user device using a portion of the primary account identifier;
based on transmitting a first terminal type value for the terminal type indicator:
receiving, by the access device from the user device, a first request message comprising the static account identifier and the encrypted identifier generated by the user device;
determining, by the access device, whether to allow access to a resource managed by the access device based at least in part on performing an offline authentication of the first request message; and
based on transmitting a second terminal type value for the terminal type indicator;
receiving, by the access device from the user device, a second request message comprising an obfuscated identifier and the encrypted identifier, the obfuscated identifier being generated by the user device based on a first portion of the primary account identifier and a second portion of the encrypted identifier; and
performing, by the access device, an online authentication of the second request message based at least in part on initiating a transaction corresponding to the second request message.

2. The computer-implemented method of claim 1, wherein the encrypted identifier is generated further utilizing a counter value stored at the user device, the user device being further configured to generate a modified counter value in response to transmitting the first request message or the second request message.

3. The computer-implemented method of claim 2, wherein generating the encrypted identifier further comprises encrypting the primary account identifier and the modified counter value with a unique derivation key stored at the user device.

4. The computer-implemented method of claim 1, wherein the second portion of the encrypted identifier comprises a right-most seven digits of the encrypted identifier.

5. The computer-implemented method of claim 1, wherein the first portion of the primary account identifier comprises a left-most eight digits of the primary account identifier.

6. The computer-implemented method of claim 1, wherein the first portion of the primary account identifier comprises an identification number associated with an acquirer.

7. The computer-implemented method of claim 1, wherein receiving the first request message comprising the static account identifier and the encrypted identifier causes the access device to perform operations comprising:
comparing the static account identifier to a plurality of stored identifiers;
rejecting the first request message when the static account identifier is included in the plurality of stored identifiers, wherein rejecting the first request message causes the user device to be denied access to the resource managed by the access device; and
approving the first request message the plurality of stored identifiers excludes the static account identifier, wherein approving the first request message causes the user device to be granted access to the resource managed by the access device.

8. The computer-implemented method of claim 1, wherein receiving the first request message comprising the static account identifier and the encrypted identifier further causes the access device to perform operations comprising:
generating an authorization request message comprising the static account identifier and the encrypted identifier; and
transmit the authorization request message to an authorizing entity computer.

9. The computer-implemented method of claim 8, wherein the authorizing entity computer is configured to:
receive the authorization request message comprising the static account identifier and the encrypted identifier;
identify, from a mapping, a stored primary account identifier that is associated with the static account identifier;
generate a decrypted identifier from the encrypted identifier;
compare the stored primary account identifier to the decrypted identifier; and
process the authorization request message based at least in part on comparing the stored primary account identifier to the decrypted identifier.

10. The computer-implemented method of claim 1, wherein initiating the transaction comprises:
generating an authorization request message comprising the obfuscated identifier and the encrypted identifier; and
transmitting the authorization request message to an authorizing entity computer, wherein transmitting the authorization request message comprising the obfuscated identifier and the encrypted identifier causes the authorizing entity computer:
to derive a derivation key based at least in part on a specific portion of the obfuscated identifier;
generate a decrypted identifier from the encrypted identifier utilizing the derivation key; and
process the authorization request message utilizing the decrypted identifier.

11. An access device, comprising:
one or more processors; and
one or more memories storing computer-executable instructions for communicating sensitive data, wherein executing the computer-executable instructions by the one or more processors, causes the access device to:
transmit, to a user device, a first message comprising a terminal type indicator, the user device being configured to store a static account identifier, a primary account identifier, and an encrypted identifier generated by the user device using a portion of the primary account identifier;

based on transmitting a first terminal type value for the terminal type indicator:
  receive, from the user device, a first request message comprising the static account identifier and the encrypted identifier generated by the user device; and
  determine whether to allow access to a resource managed by the access device based at least in part on performing an offline authentication of the first request message; and
based on transmitting a second terminal type value for the terminal type indicator indicating a second terminal type:
  receive, from the user device, a second request message comprising an obfuscated identifier and the encrypted identifier, the obfuscated identifier being generated by the user device based on a first portion of the primary account identifier and a second portion of the encrypted identifier; and
  perform an online authentication of the second request message based at least in part on initiating a transaction corresponding to the second request message.

12. The access device of claim 11, wherein the first terminal type value indicates the access device is associated with a transit authority.

13. The access device of claim 11, wherein determining whether to allow the access to the resource managed by the access device is executed in near real-time.

14. The user device of claim 11, wherein eight left-most digits of the static account identifier matches eight left-most digits of the primary account identifier.

15. The user device of claim 11, wherein the access device is a contactless reader.

16. The user device of claim 11, wherein executing the computer-executable instructions further causes the access device to transmit, to an authorizing entity computer, an authorization request message comprising the static account identifier and the encrypted identifier, the authorization request message being transmitted based at least in part on receiving the first request message, the authorization request message comprising a transaction type value.

17. The user device of claim 16, wherein the authorizing entity computer is configured to identify that the static account identifier of the authorization request message is the static account identifier based at least in part on identifying that the static account identifier does not end in seven zeros.

18. The user device of claim 11, wherein the first message comprises a data field that comprises the static account identifier and a checksum value, the checksum value indicating that the static account identifier is unaltered, and wherein determining whether to allow the access to the resource managed by the access device is based at least in part on determining that the checksum value indicates that the static account identifier is unaltered.

19. The user device of claim 18, wherein determining whether to allow the access to the resource managed by the access device based at least in part on receiving the first request message further comprising:
  comparing the static account identifier to a stored blacklist that indicates identifiers for which requested access is to be denied; and
  denying the access to the resource when the static account identifier is included in the stored blacklist.

20. The user device of claim 11, wherein the obfuscated identifier comprises a first eight digits of the primary account identifier, seven zeros, and a checksum value.

* * * * *